United States Patent
Arnold et al.

[19]

[11] Patent Number: 6,036,559
[45] Date of Patent: Mar. 14, 2000

[54] FLOTATION DEVICE FOR A SUBMERGED ARTICLE

[76] Inventors: David R. Arnold, 47553 Mt. Vesuvius, Macomb Township, Mich. 48044; J. Glen Arnold, 11023 Erdmann Rd., Sterling Heights, Mich. 48314

[21] Appl. No.: 09/173,905

[22] Filed: Oct. 16, 1998

[51] Int. Cl.$^7$ .................................................. B63B 22/10
[52] U.S. Cl. ..................................................... 441/8; 441/6
[58] Field of Search ..................................... 441/6–10, 95; 222/5

[56] References Cited

U.S. PATENT DOCUMENTS

| | | |
|---|---|---|
| 2,752,615 | 7/1956 | Parker . |
| 2,821,725 | 2/1958 | Harper . |
| 3,071,787 | 1/1963 | Burker . |
| 3,171,128 | 2/1965 | Shattuck . |
| 3,314,088 | 4/1967 | Nordhaus et al. . |
| 3,630,413 | 12/1971 | Beckes ........................................ 441/95 |
| 3,802,012 | 4/1974 | Middleton, Jr. ............................ 441/95 |
| 3,982,294 | 9/1976 | Hicken . |
| 4,290,159 | 9/1981 | McLennan et al. . |

FOREIGN PATENT DOCUMENTS

| | | | |
|---|---|---|---|
| WO 92/08641 | 5/1992 | WIPO ...................................... | 441/10 |

OTHER PUBLICATIONS

Water Recovery Device of David R. Arnold, Public Disclosure Dated Approximately 1989.

*Primary Examiner*—Ed Swinehart
*Attorney, Agent, or Firm*—Peter D. Keefe

[57] ABSTRACT

A flotation device for causing an article to float if accidently dropped into water has protection from being triggered unless submerged. The flotation device includes a casing, a compressed gas cartridge, a pierce head biased by compression of a firing spring, at least one trigger, a dissolvable ring, and a balloon. The at least one trigger passes through, respectively, at least one trigger orifice formed in the casing. So long as a chamfered end of the at least one trigger is held by the dissolvable ring in abutment with a chamfered trigger groove in the pierce head, the pierce head is held against the biasing force of the biasing spring. A water control feature is characterized by a rim of an end cap being narrowly spaced from the casing, thereby forming a water passage therebetween. The width of the water passage between the end cap and the casing is such as to allow water to pass therethrough to the dissolvable ring only if under hydrostatic pressure of submergence. Once water passes through the water passage, the water will contact the dissolvable ring and thereupon cause it to disintegrate. The at least one trigger will then be forced upward by the chamfered trigger groove as the dissolvable ring disintegrates until the chamfered end of each trigger clears the pierce head. The firing spring will thereupon cause the pierce head to move toward the compressed gas cartridge. Upon contact, a pin point of the pierce head will pierce the compressed gas cartridge. Escaping compressed gas fills the balloon and results in a positive buoyancy which floats an attached article.

19 Claims, 3 Drawing Sheets

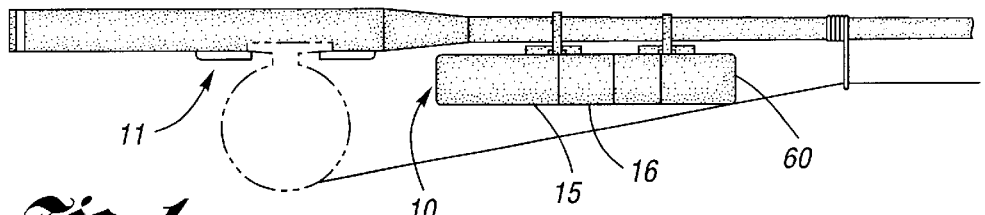
Fig. 1
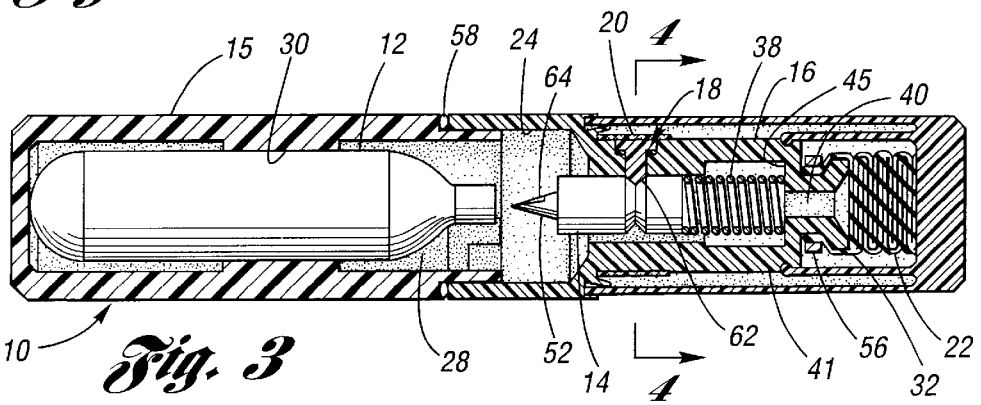
Fig. 3
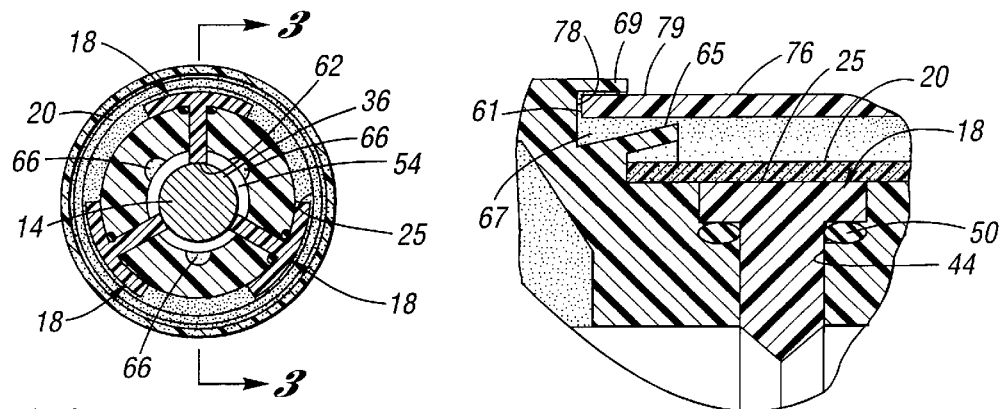
Fig. 4
Fig. 6
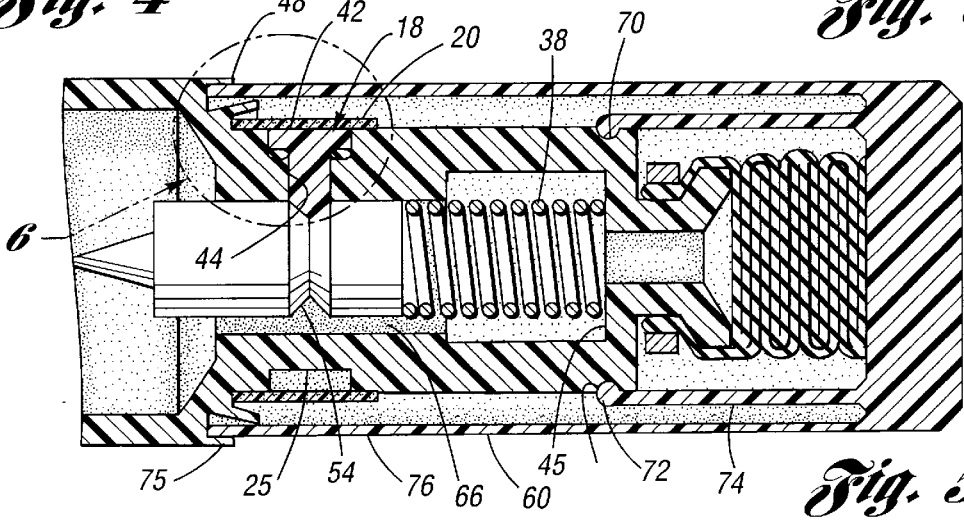
Fig. 5

FLOTATION DEVICE FOR A SUBMERGED ARTICLE

BACKGROUND OF THE INVENTION

1. Field of the Invention

The present invention relates generally to flotation devices and more specifically to a flotation device which provides recovery of an article which has fallen into a body of water.

2. Discussion of the Prior Art

A problem sometimes encountered, particularly during water related sports such as fishing and duck hunting, is the accidental dropping of expensive gear into a body of water. Unless the body of water is very shallow, retrieval of the article is probably nearly impossible or dangerous without scuba equipment.

There have been several attempts to provide a device which can be used for either indicating the proximity of the sunken article, or facilitating the flotation thereof The first group of inventions indicate the proximity of the article as disclosed in U.S. Pat. No. 3,982,294 to Hicken and U.S. Pat. No. 4,290,159 to McLennan et al. The second group of inventions facilitate the flotation of the article as disclosed in U.S. Pat. No. 2,752,615 to Parker, U.S. Pat. No. 2,821,725 to Harper, and U.S. Pat. No. 3,071,787 to Burker.

The first group of inventions utilize a capsule containing a flotation device and a length of filament. The capsule is attached to the article. If the article falls into the water, a water soluble device is consumed and releases a flotation device. The flotation device is attached to a long filament which is also attached to the capsule. The filament unwinds off a spool until the article finds the bottom of the body of water. There are at least two drawbacks to these devices. First, if the body of water is too deep, the article will pull the flotation device under the surface, making detection probably impossible. Second, if the article becomes tangled in weeds or the like, the filament may break during retrieval of the article.

The second group of inventions utilize a capsule containing a compressed gas cartridge, a piercing pin, a water soluble trigger, and a balloon. The capsule is attached to an article. When the article is submerged in water, the water soluble trigger is consumed and the piercing pin is forced into an end of the compressed gas cartridge. The balloon is filled with gas and causes the article to float. The drawback to each of these inventions is the premature dissolving of the water soluble trigger if moisture or water from dew, rain, snow or exposure to other wetness occurs, whereupon the balloon prematurely inflates.

Accordingly, there is a clearly felt need in the art for a flotation device which causes an article to float if accidently dropped in water while providing protection from being prematurely triggered.

SUMMARY OF THE INVENTION

The present invention is a flotation device which causes an article to float if accidently dropped in water, while providing protection from being prematurely triggered.

The flotation device according to the present invention has a deployment assembly which includes a front casing, a compressed gas cartridge, a pierce head biased by compression of a firing spring, a rear casing, at least one trigger, a dissolvable ring, and a balloon. The compressed gas cartridge is inserted into a first end of the front casing. The first end of the front casing is attached to a second end of the rear casing at assembly. A flared balloon base is formed on a first end of the rear casing for the attachment of the balloon. The firing spring and pierce head are inserted into the second end of the rear casing.

The at least one trigger passes through, respectively, at least one trigger orifice formed in the rear casing. So long as a chamfered end of the at least one trigger abuts a chamfered trigger groove in the pierce head, the pierce head is held against the biasing force of the biasing spring. In this regard, a dissolvable ring is slid over the at least one trigger which keeps the chamfered end in the chamfered trigger groove.

The flotation device further includes a water control feature, wherein a rim at an end portion of an outer sleeve of an end cap is interfaced with a cap groove formed in the rear casing. The outer sleeve is spaced from the cap groove such that a narrow water passage is formed therebetween. The width of the water passage between the outer sleeve and the cap groove is maintained by an inner sleeve of the end cap snapping into an aliment groove in the first end of the rear casing. The cap groove preferably includes a flared pocket for trapping rain, moisture or other wetness not under hydrostatic pressure to thereby help prevent premature actuation.

The flotation device will deploy in the following manner when submerged in a body of water. The hydrostatic pressure in the body of water will be sufficient to overcome the surface tension created by the water passage between the rear casing and the end cap. Once water passes through the water passage, the water will contact the dissolvable ring and thereupon cause it to disintegrate. The at least one trigger will be forced upward by the chamfered trigger groove as the dissolvable ring disintegrates until the chamfered end of each trigger clears the pierce head. The fling spring will now cause the pierce head to move forcibly toward the compressed gas cartridge. Upon contact, a pin point disposed on an end of the pierce head will pierce the compressed gas cartridge. Escaping compressed gas (preferably carbon dioxide) fills the balloon and results in a positive buoyancy which causes an article attached thereto to float.

Accordingly, it is an object of the present invention to provide a flotation device which causes an article to float if inadvertently dropped into a body of water.

It is a further object of the present invention to provide a flotation device which will not be triggered by exposure to precipitation or other sources of wetness not driven by hydrostatic pressure, but will be triggered during submersion.

Finally, it is another object of the present invention to provide a flotation device which may be easily mounted to an article.

These and additional objects, advantages, features and benefits of the present invention will become apparent from the following specification.

BRIEF DESCRIPTION OF THE DRAWINGS

FIG. 1 is a side view of a flotation device according to the present invention, shown in operation attached to an article in the form of a fishing rod in accordance with the present invention.

FIG. 2 is an exploded perspective view of the flotation device in accordance with the present invention.

FIG. 3 is a partly cross-sectional side view of the flotation device in accordance with the present invention.

FIG. 4 is a cross-sectional end view seen along line 4—4 of FIG. 3, showing the flotation device in accordance with the present invention.

FIG. 5 is a partly cross-sectional side view of the flotation device according to the present invention, showing an end cap mating with a rear casing in accordance with the present invention.

DETAILED DESCRIPTION OF THE PREFERRED EMBODIMENT

Figure 6:
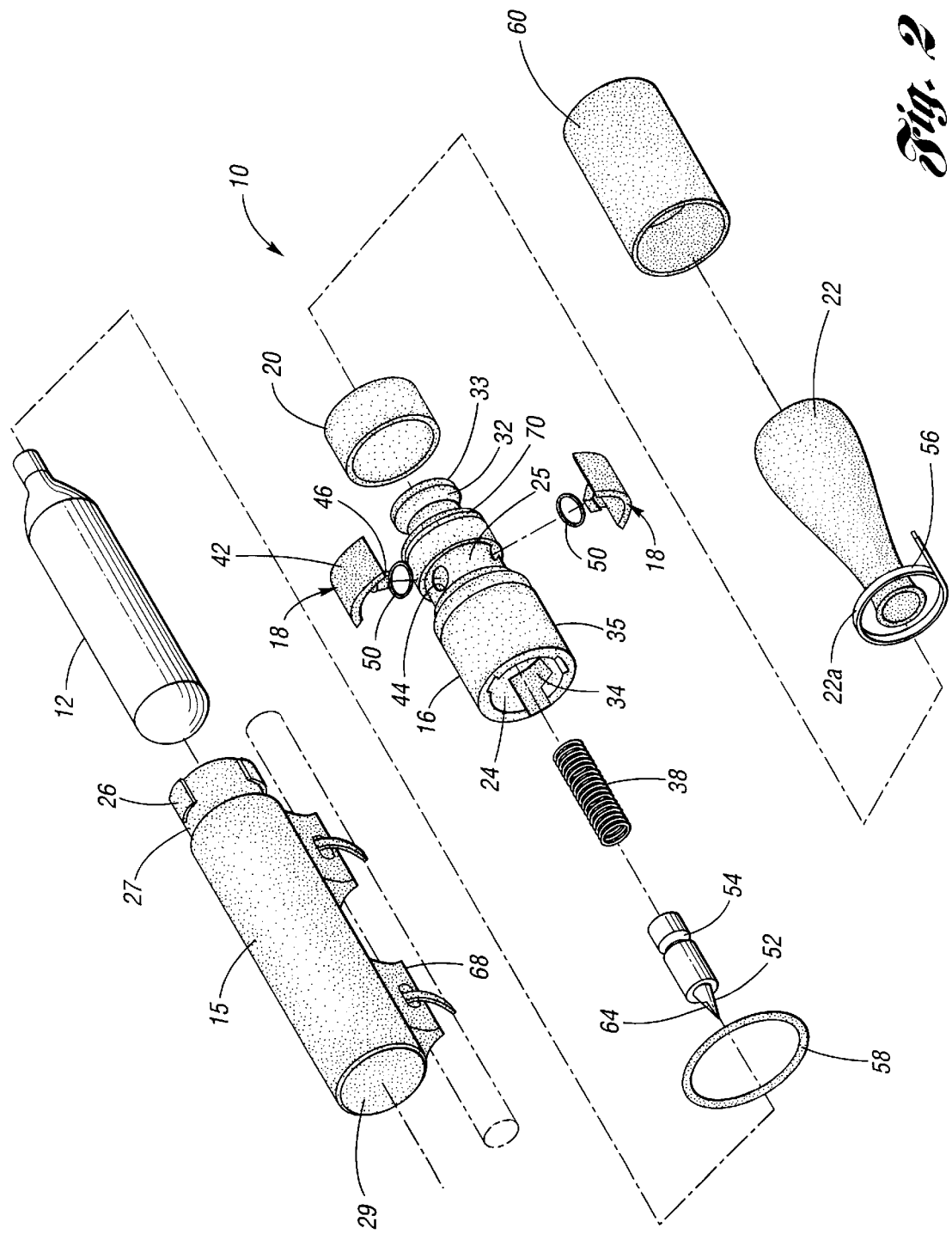
FIG. 6 is an enlarged cross-sectional view, seen at circle 6 of FIG. 5, showing of an outer sleeve of the end cap interfacing with a cap groove in the rear casing to form a water passage therebetween in accordance with the present invention.

With reference now to the Drawing, FIG. 1 shows a flotation device 10 according to the present invention in association with an article 11 in the form of, by way of example, a fishing rod. The flotation device 10 inflates a balloon in response to the article falling into a body of water to thereby provide positive buoyancy thereto. Uniquely, the flotation device 10 is provided with a water control feature which only permits water under hydrostatic of submersion to cause actuation of inflation of the balloon.

Referring now to FIGS. 2 through 6, the flotation device 10 includes a front casing 15, a rear casing 16, a compressed gas cartridge 12 for providing a source of compressed gas, a pierce head 14 for piercing the compressed gas cartridge under urging of a compressed firing spring 38, a water dissolvable ring 20, at least one trigger 18 for holding the pierce head against the force of the firing spring as long as the dissolvable ring remains intact, a balloon or other gaseously inflatable member 22 for being inflated by gas escaping from the compressed gas cartridge, and a water control feature in the form of a narrow water passage 79 for allowing only water under the hydrostatic pressure of submergence to reach the dissolvable ring.

The front casing 15 has a first end 27 with at least one lock tab 26 formed on the outside thereof A cartridge bore 28 originates at the first end 27 of the front casing 16 and extends to a second end 29 thereof An inner diameter 30 of the cartridge bore 28 is sized to snugly, yet slidably, receive the compressed gas cartridge 12.

A flared balloon base 32 is formed on a first end 33 of the rear casing 16 for the attachment thereto of the open end of the balloon 22. A casing bore 24 is sized to slidably receive the first end 27 of the front casing 15 and originates at a second end 35 of the rear casing 16. At least one lock slot 34 is disposed in the casing bore 24 and is sized to slidably receive and then interfering retain, when relatively rotated, the at least one lock tab 26 of the front casing 10. A pin bore 36 originating at the second end 35 of the rear casing 16 and extending to substantially the first end 33 of the rear casing 16 is sized to slidably receive the pierce head 14 and the firing spring 38. The firing spring 38 is trapped by an abutment 45 and compressibly biases against the pierce head 14 toward the compressed gas cartridge 12. A gas hole 40 is formed through the first end 33 of the rear casing 16.

The rear casing 16 has a reduced diameter portion 41 to provide slide-over clearance for the dissolvable ring 20. An arc shaped thrust plate 42 of each trigger 18 is located in a trigger groove 25 so as to be flush with the reduced diameter 41. A trigger orifice 44 for each trigger 18 is formed at the trigger groove 25 and communicates with the pin bore 36 at substantialy the middle of the rear casing 16. Each trigger orifice 44 is sized to slidably receive a trigger tip 46, respectively, of each trigger 18. A trigger O-ring 50 seals the pin bore 36 from moisture and prevents gas leakage while the balloon is inflating at each trigger orifice 44. The dissolvable ring 20 is slid over the reduced diameter portion 41 until it is located over the thrust plate 42 of the at least one trigger 18.

The pierce head 14 has a pin point 52 disposed at one end and a chamfered trigger groove 54 disposed remote therefrom. The chamfered trigger groove 54 is sized to receive a chamfered tip 62 of each trigger tip 46.

The dissolvable ring 20 is structured to circumferentially overlay the thrust plate 42 of the at least one trigger 18 so as to retain each trigger tip 46 seated in the chamfered trigger groove 54. In this regard, it is preferred for the thrust plate 42 to be arc shaped and of large surface area so that the pressure of its abutment (originating by the biasing of the firing spring 38) with the inside surface of the dissolvable ring is minimized. The material of choice of the dissolvable ring 20 is one that readily dissolves in water, yet is structurally strong when dry. A preferred material for the dissolvable ring 20 is a water soluble plastic, such as polyvinyl alcohol, as this material is less moisture sensitive than other water dissolvable materials known in the art. The mechanical strength of the dissolvable ring 20 is related to that necessary to withstand the pressure of each thrust plate 42, as generated by the combination of the angle of chamfer of the chamfered trigger groove 54, the angle of chamfer of the chamfered end 62 and the compression force of the firing spring 38.

The water control feature for providing water entry to the dissolvable ring only upon submergence will now be described with particular reference being directed to FIGS. 4 through 6.

An end cap 60 is provided which serves to protectively cover the rearward portion of the flotation device 10. The end cap 60 has an outer sleeve 76 terminating at a rim 61 which interfaces with a cap groove 78 formed in an edge 48 of the rear casing 16 adjacent to, and radially outwardly displaced from, the trigger groove 25. The outer sleeve 76 and the cap groove 78 are configured to mutually provide a water passage 79 therebetween which communicates with the dissolvable ring 20. Ln this regard, the preferred configuration of the cap groove 78 includes an angled surface 65 which is angularly oriented relative to the outer sleeve 76 to provide a flared inner pocket 67 which is widest at the rim 61. The purpose of the flared inner pocket 67 is to hold moisture, condensation or wetness not driven by hydrostatic pressure from reaching the dissolvable ring 20. An outer wall 69 of the cap groove 78 is preferably provided for protecting the water passage 79, having a plurality of drain notches 75.

The width of the water passage 79 between the rim 61 and the cap groove, is close enough to retard moisture from rain and melting snow to pass therethrough on account of surface tension effects, yet wide enough for water under hydrostatic pressure of submersion in a body of water to pass therethrough For example, for water entry though the water passage due to submergence to a depth of at least one foot, the width of the water passage 79 would be on the order of about ten-thousandths of an inch.

The narrow width of separation between the outer sleeve 76 and the rear casing 16 which provides the water passage 79 is maintained by an inner sleeve 74 of the end cap 60 snapping into an affixment groove 70 formed in the rear casing 16. In this regard, the inner sleeve 74 is terminated by an inwardly facing annular boss 72 which is sized to be received by the affixment groove 70 disposed adjacent the flared balloon base 32.

The flotation device 10 is assembled in the follow manner. Each trigger O-ring 50 is placed over each trigger tip 46. The compressed gas cartridge 12 is inserted into the cartridge bore 28. The firing spring 38 is inserted into the pin bore 36. The pierce head 14 is then inserted into the pin bore 36 and pushed against the firing spring 38, thereby compressing it, until the grooved cocking channel 54 is aligned with each trigger orifice 44. Each trigger tip 46 is inserted, respectively, into each trigger orifice 44, wherein the chamfered end 62 thereof is received into the chamfered trigger groove 54. The dissolvable ring 20 is slid over the respective thrust plate 42 of the at least one trigger 18, whereupon each chamfered end 62 is retained in the chamfered trigger groove 54 so as to thereby hold the pierce head 14 against the biasing of the f spring 38. The open end of the balloon 22 is stretched over the flared balloon base 32 and secured with a retaining strap 56. A casing O-ring 58 is slid over the first end 27 of the front casing 10. The at least one lock tab 26 on the front casing 15 is inserted into the at least one lock slot 34 of the rear casing 16, and the front casing 15 is then rotated relative to the rear casing so that an interfering fit therebetween engages the front and rear casings together. The purpose of the casing O-ring 58 is to seal the cojoinder of the front and rear casings. Finally, the inward facing annular boss 72 of the end cap 60 is pushed into the affixment groove 70 disposed on the first end 33 of the rear casing 16 to protect the balloon 22 and to establish the water passage 79. Alternatively, the front casing may be sonically welded or adhesively joined to the rear casing, thereby obviating the lock slots, lock tabs and O-ring 58.

Figure 7:
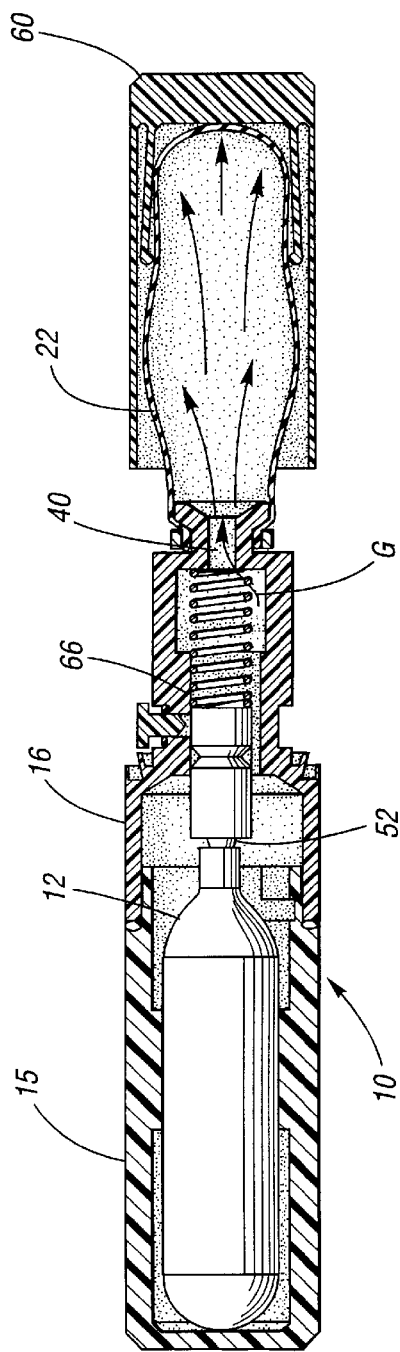
FIG. 7 is a partly cross-sectional side view of the flotation device according to the present invention, shown during actuation in accordance with the present invention.
Figure 8:
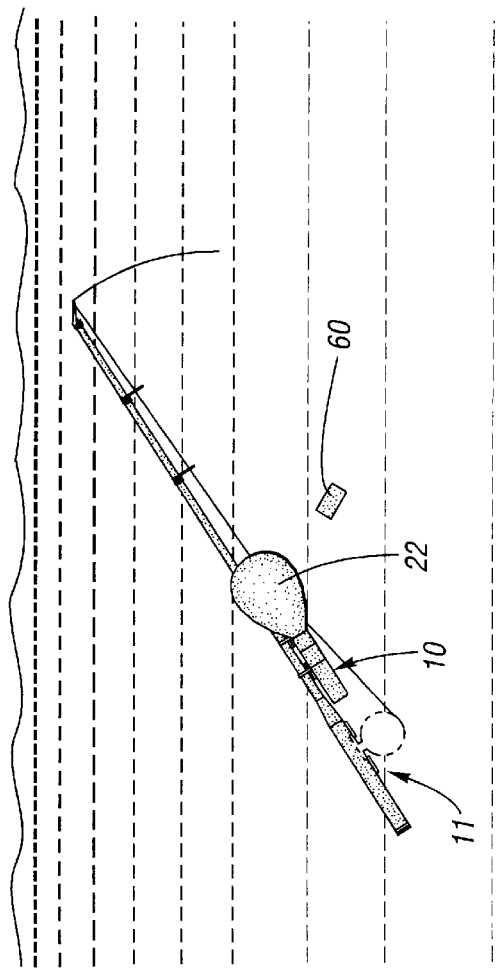
FIG. 8 is a side view of the flotation device according to the present invention, shown attached to an article in the form of a fishing rod, providing positive buoyancy thereto after actuation in accordance with the present invention.

FIGS. 7 and 8 show the deployment of the flotation device 10.

The hydrostatic pressure of the body of water will be sufficient to overcome the surface tension created at the water passage 79 between the rear casing 16 and the end cap 60 when the article 11 is submerged to a predetermined depth (for example, a minimal depth of one foot). As water passes through the water passage 79, the water will contact the dissolvable ring 20 and thereupon cause it to structurally disintegrate.

Axial force exerted by compression of the firing spring 38 on the pierce head 14 forces the chamfered end 62 of each trigger tip 46 against the chamfered trigger groove 54, the resolution of which results in force on each thrust plate 42 upwardly against the dissolvable ring 20. The combination of the thrust plate 42 upward force and the structural disintegration of the dissolvable ring 20 will result in each thrust plate 42 entering the space formerly exclusively occupied by the dissolvable ring 20, whereupon each trigger tip 46 clears the chamfered trigger groove 54. Now, the pierce head 14 is not restrained, and the ring spring 38 propels it toward the compressed gas cartridge 12. Upon contact, the pin point 52 pierces the compressed gas cartridge 12. The pin point 52 has an escape groove 64 on the face thereof which allows gas to escape from the compressed gas cartridge 12.

As shown at FIG. 4, the escaping gas will travel through at least one channel 66 formed in the pin bore 36 to the gas hole 40, or at least through the clearance between the pierce head 14 and the pin bore 36. As shown at FIG. 7, the escaping pressurized gas G (preferably carbon dioxide gas) will fill the balloon 22 and force the end cap 60 off the rear casing 16. The gas inflated balloon 22 will expand sufficiently to provide positive buoyancy for the article 11 to float, as shown in FIG. 8.

An optional tie strap projection 68 may be formed on the outside surface of the front casing 15 and/or the rear casing 16 to accommodate the use of tie straps, or other attachment items, to attach the flotation device 10 to an article.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A flotation device for providing positive buoyancy for a submerged article attached thereto, said flotation device comprising:

a casing having a cartridge bore and a communicating pin bore;

a pierce head slidably mounted in said pin bore;

biasing means for biasing said pierce head toward said cartridge bore;

dissolvable material means for dissolving upon contact with water;

trigger means for retaining said pierce head at a predetermined location of said pin bore, said trigger means releasing said pierce head to move biasably toward said cartridge bore responsive to dissolving of said dissolvable material;

an inflatable member connected with said casing;

buoyancy means for inflating said inflatable member responsive to said trigger means releasing said pierce head; and water control means for regulating water contact with said dissolvable material means responsive to the water having a predetermined minimum hydrostatic pressure of submergence;

wherein said water control means comprises a continually unsealed water passage having a predetermined width; wherein water must pass through said water passage in order to reach said dissolvable mater means from a location exterior to said casing.

2. The flotation device of claim 1, wherein said trigger means and said dissolvable material means comprise:

said casing having at least one trigger orifice formed radially therein, said at least one trigger orifice communicating with said pin bore;

a ring of water dissolvable material;

at least one trigger respectively located in said at least one trigger orifice so as to be radially slidable with respect to said casing; and a chamfered trigger groove formed on said pierce head;

wherein a chamfered end of said at least one trigger is located in said chamfered trigger groove and retained therein by abutment with said ring, and wherein said at least one trigger further comprises an arc shaped thrust plate which abuttably interfaces said ring.

3. The flotation device of claim 1, wherein said water control means comprises a water passage having a predetermined width; wherein water must pass through said water passage in order to reach said dissolvable material means from a location exterior to said casing.

4. The flotation device of claim 1, wherein said water control means further comprises:

an end cap removably connected to said casing; and a cap groove formed in said casing;

wherein said water passage is formed at an interface between said end cap and said cap groove.

5. The flotation device of claim 4, wherein said inflatable member is located substantially within said end cap, and wherein said removable connection of said end cap to said casing is structured to separate said end cap from said casing in response to said inflatable member inflating.

6. The flotation device of claim 5, wherein said end cap has an inner sleeve, said inner sleeve snappingly interfacing with said casing to thereby define said removable connection, said water passage being defined by said inner sleeve when snappingly interfaced with said easing.

7. The flotation device of claim 5, wherein said end cap has a rim; said water passage further comprising said casing having an angled surface adjacent said cap groove, wherein said angled surface angles toward said end cap to thereby form a flared pocket therebetween, said flared pocket being widest at said rim.

8. The flotation device of claim 7, wherein said trigger means and said dissolvable material means comprise:

said casing having at least one trigger orifice formed radially therein, said at least one trigger orifice communicating with said pin bore;

a ring of water dissolvable mater;

at least one trigger respectively located in said at least one trigger orifice so as to be radially slidable with respect to said casing; and a chamfered trigger groove formed on said pierce head;

wherein a chamfered end of said at least one trigger is located in said chamfered trigger groove and retained therein by abutment with said ring.

9. The flotation device of claim 8, wherein said at least one trigger further comprises an arc shaped thrust plate which abuttably interfaces said ring.

10. The flotation device of claim 9, wherein said cap groove has an end wall concentric to said rim, said end wall having a plurality of drain notches formed therein.

11. The flotation device of claim 10, wherein said end cap has an inner sleeve, said inner sleeve snappingly interfacing with said casing to thereby define said removable connection, said water passage being defined by said inner sleeve when snappingly interfaced with said casing.

12. A flotation device for providing positive buoyancy for a submerged article attached thereto, said flotation device comprising;

a casing having a cartridge bore and a communicating pin bore;

a pierce head slidably mounted in said pin bore;

biasing means for biasing said pierce head toward said cartridge bore;

dissolvable material means for dissolving upon contact with water;

trigger means for retaining said pierce head at a predetermined location of said pin bore, said trigger means releasing said pierce head to move biasably toward said cartridge bore responsive to dissolving of said dissolvable material;

an inflatable member connected with said casing;

buoyancy means for inflating said inflatable member responsive to said trigger means releasing said pierce head; and water control means for regulating water contact with said dissolvable material means responsive to the water having a predetermined minimum hydrostatic pressure of submergence;

wherein said trigger means and said dissolvable material means comprise:

said casing having at least one trigger orifice formed radially therein, said at least one trigger orifice communicating with said pin bore;

a ring of water dissolvable material;

at least one trigger respectively located in said at least one trigger orifice so as to be radially slidable with respect to said casing; and a chamfered trigger groove formed on said pierce head;

wherein a chamfered end of said at least one trigger is located in said chamfered trigger groove and retained therein by abutment with said ring; and wherein said at least one trigger further comprises an arc shaped thrust plate which abuttably interfaces said ring;

wherein said water control means comprises a water passage having a predetermined width;

wherein water must pass through said water passage in order to reach said dissolvable material means from a location exterior to said casing.

13. The flotation device of claim 12, wherein said water control means further comprises:

an end cap removably connected to said casing; and a cap groove formed in said casing;

wherein said water passage is formed at an interface between said end cap and said cap groove.

14. The flotation device of claim 13, wherein said inflatable member is located substantially within said end cap, and wherein said removable connection of said end cap to said casing is structured to separate said end cap from said casing in response to said inflatable member inflating.

15. The flotation device of claim 14, wherein said end cap has an inner sleeve, said inner sleeve snappingly interfacing with said casing to thereby define said removable connection, said water passage being defined by said inner sleeve when snappingly interfaced with said casing.

16. The flotation device of claim 15, wherein said end cap has a rim; said water passage further comprising said casing having an angled surface adjacent said cap groove, wherein said angled surface angles toward said end cap to thereby form a flared pocket therebetween, said flared pocket being widest at said rim.

17. The flotation device of claim 16, wherein said at least one trigger further comprises an arc shaped thrust plate which abuttably interfaces said ring.

18. The flotation device of claim 17, wherein said cap groove has an end wall concentric to said rim, said end wall having a plurality of drain notches formed therein.

19. A flotation device for providing positive buoyancy for a submerged article attached thereto, sad flotation device comprising:

a casing having a cartridge bore and a communicating pin bore;

a pierce head slidably mounted in said pin bore;

biasing means for biasing said pierce head toward said cartridge bore;

dissolvable material means for dissolving upon contact with water;

trigger means for retaining said pierce head at a predetermined location of said pin bore, said trigger means releasing said pierce head to move biasably toward said cartridge bore responsive to dissolving of said dissolvable material;

an inflatable member connected with said casing;

buoyancy means for inflating said inflatable member responsive to said trigger means releasing said pierce head; and water control means for regulating water contact with said dissolvable material means responsive to the water having a predetermined minimum hydrostatic pressure of submergence;

wherein said trigger means and said dissolvable material means comprise:

said casing having at least one trigger orifice formed radially therein, said at least one trigger orifice communicating with said pin bore;

a ring of water dissolvable material;

at least one trigger respectively located in said at least one trigger orifice so as to be radially slidable with respect to said casing; and a chamfered trigger groove formed on said pierce head;

wherein a chamfered end of said at least one trigger is located in said chamfered trigger groove and retained therein by abutment with said ring; and wherein said at least one trigger further comprises an arc shaped thrust plate which abuttably interfaces said ring.

* * * * *